United States Patent Office 3,032,533
Patented May 1, 1962

3,032,533
PROCESS FOR PRODUCING PHENOL-MODIFIED COUMARONE-INDENE TYPE RESINS
James R. Patterson, Harvey B. Wheeler, and John J. Freeman, Pittsburgh, Pa., assignors to Neville Chemical Company, Pittsburgh, Pa., a corporation of Pennsylvania
No Drawing. Filed June 25, 1957, Ser. No. 667,973
9 Claims. (Cl. 260—47)

This invention relates to a process for producing phenol-modified coumarone-indene type resins by reacting coumarone, indene and their homologs with phenols in the presence of an organic complex of boron trifluoride.

The phenol-modified coumarone-indene type resins have in the past been manufactured by reacting mixtures of phenols and naphthas containing coumarone and indene and their homologs as the principal polymerizable constituents, in the presence of a catalyst, such as acid treated clay. By this process an oily condensation product is produced, together with a solid resin. Both products are compatible with other resins such as vinyl acetate and the cellulose derivatives thereof. In general, their compatibility and solubility characteristics are broader in range than the straight coumarone-indene type resin. They are widely used in adhesives, lacquers, paper coatings, special inks, varnishes, etc. The liquid product is used as an anti-skinning agent for varnishes, enamels and inks and as a plasticizer for other resins.

It has now been found that substantially improved results can be obtained by the use of a catalyst not heretofore employed for the manufacture of these types of products.

In a broad embodiment, the process comprises reacting indene, coumarone and their homologs with a phenol in the presence of an organic complex of boron trifluoride, such as boron trifluoride ethyl etherate, and thereafter recovering the normally liquid condensation product and the normally solid resin.

In one specific embodiment, the process (No. 1) comprises mixing a suitable phenol such as crude cresylic acid with a boron trifluoride complex such as boron trifluoride ethyl etherate and a suitable aromatic diluent, heating the mixture to a temperature of about 50° C. to about 105° C. and preferably at 50°–85° C., adding thereto indene, coumarone and their homologs, continuing the heating preferably at a temperature of about 90°–95° C. until no further reaction takes place as indicated by a constant specific gravity of the reaction mixture, neutralizing the catalyst, for example, with a suitable clay, filtering, removing the solvent, removing the liquid polymer by steam or vacuum distillation condensing, and recovering liquid polymer, and recovering the solid resin.

In another specific embodiment, the process (No. 2) comprises forming a mixture of phenols and coumarone-indene and their homologs, heating the mixture to approximately 50°–60° C., adding the $BF_3$ complex catalyst at a rate such that the increase in temperature which occurs does not substantially exceed 60°–65° C., continuing the heating at a temperature of about 65° C. to about 105° C. and preferably about 65° C. to 70° C., until the reaction is complete as indicated by no substantial further increase in specific gravity of the reaction mixture, and recovering the products as described in the foregoing paragraph.

Boron trifluoride complexes with, for example, acetic or propionic acid, and ethers, such as methyl-ethyl ether, ethyl ether, propyl ethers and the like, have been used for the preparation of unmodified coumarone-indene oils and resins and other types of resins. It is reported, however, that the particular manipulative steps are of critical importance if a satisfactorily alcohol-soluble product is to be obtained from resins such as the phenol-modified terpene resins. Alcohol solubility is an essential for these types of resin. For example, in the Geiger Patents 2,502,003 and 2,596,235 it is stated that the critical manipulative steps comprise forming a mixture of the catalyst and the phenol and then adding the unsaturated compound, such as the terpene or an aromatic vinyl compound. He states that extremely poor alcohol solubility is obtained if the reactants and the catalyst are mixed together, or if the catalyst is added, either all at one time or in portions, to a mixture of the phenol and the unsaturated compound. From these teachings one would assume that a similar result was to be anticipated if the boron trifluoride complex were to be used in the manufacture of phenol-modified coumarone-indene type resins.

Surprisingly enough, however, this is not the case. Moreover, it has now been discovered that by a proper choice of the manipulative steps employed, the yield of a given product of the reaction can be controlled so as to produce either large amounts of the normally liquid condensation product together with substantial amounts of the solid resin by the steps as described in the first embodiment, or to produce the solid resin to the virtual exclusion of the liquid product by following the steps of the second embodiment.

Furthermore, it has been found that the reaction time is substantially less than that required when using the conventional catalyst for producing phenol-modified coumarone-indene resins. The proportion of the phenols required to completely react with the polymerizable components of the courmarone-indene naphthas is substantially reduced. This is an important consideration, since the phenols cost several times as much as the indene-containing naphthas. Currently the price per gallon of cresylic acid is about four times that of coal tar heavy naphtha. The overall production or yield of the desired products is increased substantially and their properties, such as solubility in alcohols, is at least equal to that produced by the prior art methods.

The crude naphthas from which phenol-modified coumarone-indene type resins are prepared may be derived from a variety of sources such as from coal tar naphthas, naphtha fractions produced in the manufacture of gas from gas oil, etc., and from the severe cracking of petroleum oils, such as gas oil and the like. These naphthas may or may not contain minor percentages of phenols, say up to possibly 3% or 4%. They usually have a boiling range of from about 160°–200° C., preferably about 165° C. to 190° C.

For use in the present process the crude naphtha must pass a methanol dilution test which is made by thoroughly mixing 5 ml. of naphtha with 45 ml. of anhydrous methanol at room temperature. If any immediate cloud or haziness is observed, the naphtha cannot be used directly in this process. The materials causing cloudiness are removed, usually by redistillation. When the crude naphtha passes the methanol dilution test, a suitable inhibitor is at once added to prevent formation of polymerization or oxidation products during storage before use. Cresylic acids may be used as antioxidants in proportions up to say 0.5%–2%. Other phenolic antioxidants may be used. The naphtha must be substantially anhydrous and should not contain tar bases in excess of about 0.005%. The tar bases can be removed by agitation with dilute sulfuric acid, for example, 10% by volume of 10% $H_2SO_4$. After the acid treatment, the naphtha may be washed with water and then dried by any suitable method such as by means of calcium chloride or other suitable dehydrating agent.

The source of phenols employed may vary, but they are normally a mixture of cresylic acids obtainable in commerce. Cresylic acids of the following characteristics have been used successfully:

|  | Percent |
|---|---|
| Phenol | 0–19 |
| m- and p-Cresol | 16–62.5 |
| o-Cresol | 0–26 |
| Xylenols and higher | 18–82 |

These must contain not more than 0.05% by volume of water. If the cresylic acids, as received, contain water in excess of this it can be removed by azeotropic distillation, for example, with benzol, or by other suitable known methods. The tar base content of the cresylic acid should not be in excess of 0.10%. These can be removed by treatment with dilute acid solutions followed by water washing and drying.

The catalyst is prepared by mixing boron trifluoride with a suitable organic compound such as ethyl ether, methyl-ethyl ether, n- or iso-propyl ether, acetic acid, propionic acid and the like in stoichiometric proportions. The catalyst also should be substantially anhydrous.

The proportions of the cresylic acids to the naphtha should be such that at the end of the reaction there is a small excess, for example, up to about 2% of free phenols. The exact proportions will vary somewhat depending upon the polymerizable content of the coal tar or other indene-containing naphtha and is usually about 15% to 25% by volume of the naphtha. The resin forming constituents of the naphtha may vary from about 40% upward. The principal polymerizable constituent is indene (usually about 65% or more based on the polymerizables present) with minor amounts of coumarone and homologs of indene and coumarone. It is preferred to use naphthas having a polymerizable content in the neighborhood of about 60% or more, say 60–90% or more, and an indene content of at least 40% by volume.

The temperatures employed may be in the range of 50°–110°. These depend in part upon the particular manipulative procedure being used. In the first procedure described above, the temperatures preferably range from about 75° to about 90° C. It is preferred that the temperature be kept below about 80° C. to about 85° C. until all of the naphtha has been added, after which it is raised to about 90° C. to 95° C. to complete the reaction. In the second procedure described above the initial temperature is kept at about 25° C. to about 60° C., until all of the catalyst has been added, and then it is raised to about 65° C. to about 70° C. to complete the reaction.

The pressures employed are not critical, being merely sufficient to prevent loss by evaporation of the reactants and/or solvent. While superatmospheric pressure may be employed, normally the pressure is about that of the vapor pressure of the reaction mixture at the temperature employed.

In the first procedure described above, a diluent is usually employed. This is suitably an essentially aromatic solvent boiling substantially above the reaction temperature and substantially below about 250° C. Thus, toluene, xylenes, and other alkyl benzenes may be used. Aromatic fractions from catalytic reforming of gasoline or the like may be used. The proportion of diluent depends in part upon the proportion of non-polymerizable components in the naphtha. These are largely aromatic compounds including trimethyl benzenes.

In order to demonstrate the unique characteristics of our process as compared with the prior art commercial process, three runs were made employing a coal tar heavy naphtha boiling at about 165° C. to about 190° C. The polymerizable content of the naphtha was about 68% of which the major portion was indene. (The polymerizable content of the naphtha is the volume percent which can be converted to a coumarone-indene resin by the usual sulfuric acid polymerization procedure for making C–I resins.) Crude cresylic acid, which was a mixture of phenols, principally o-, m- and p-xylenols, was employed. The diluent, where used, was essentially aromatic and had a boiling point range below about 300° C. The catalyst used in the process of this invention was a complex of boron trifluoride and ethyl ether made by mixing the two in stoichiometric proportions. As acid-treated montmorillonite-type clay of a type which has been used for manufacturing phenol-modified coumarone-indene resins for many years, was employed as a basis for comparison. It contained 15–20% by weight of moisture, which has been found optimum for this catalyst in this type of reaction. The reactants met the specifications set forth above. The proportions of charge, time and yield are set forth in the accompanying Table I.

In the run with the clay catalyst, the crude naphtha and cresylic acid in the proportion shown in Table I plus about 10% by volume of xylenes, were charged to the reactor, which was then heated with agitation to a temperature of 85° C. The acid-treated clay catalyst (Super Filtrol) was added in equal increments over a period of one hour. During this time the temperature was not allowed to rise above 85° C. The temperature of the reaction, which is exothermic, was controlled partly by the use of cooling water, and in part by the rate at which the catalyst was added. The temperature was then raised to 98° C. and held there for the remainder of the reaction, which required an additional three hours. Samples were taken at intervals and the reaction was considered complete when the specific gravity was constant for three consecutive determinations. The specific gravity of the mixture in this particular case was about 1.015 at 30° C. The mixture was filtered while hot to remove the catalyst, and the solvent was removed by atmospheric distillation to a temperature of about 250° C. The residue in the still was then subjected to steam distillation at a maximum temperature of 250° C. until the liquid resin had been removed and the normally hard resin had a softening point of 86° C. by the ball and shouldered-ring method. The oily overhead product was then subjected to atmospheric distillation to an initial boiling point of about 300° C.

In the first procedure of this invention, designated No. 1 in the table, the cresylic acid and about 15% of the diluent were first charged to the reactor and the catalyst then added. The mixture was heated with agitation to a temperature of 85° C. The crude coal tar naphtha was added over a period of one hour. The temperature was controlled at 85–90° C. by altering the rate of addition of the crude naphtha and by the use of a cooling bath. After all of the naphtha had been added, the temperature was raised to 95° C. where it was maintained until the reaction was complete, as shown by a constant specific gravity of the reaction mixture in four consecutive determinations.

The reaction mixture was pumped while hot to a clay treater and the indicated amount of Attapulgus clay was added with agitation to neutralize the catalyst. The mixture was heated at about 100°–110° C. for one hour and the clay was then removed by filtration. The heavy oil and the solid resin were then recovered by the same procedure employed for the products made by use of the acid-treated clay catalyst.

In the second procedure of this invention (No. 2 of Table I), a mixture of the crude naphtha and cresylic acid was charged to the reactor and was then heated with agitation to about 55° C. The catalyst was added in increments over a period of appproximately one hour. No solvent or diluent was used in this procedure. After the catalyst had all been added, the temperature was allowed to rise to about 65°–70° C. and was maintained at this point until the specific gravity became constant, as shown by four consecutive determinations. The reaction mixture was then neutralized with clay and the heavy oil and solid resin was recovered as in the preceding process.

The results of the runs are shown in Table I.

Table I

|  | Process | | |
|---|---|---|---|
|  | Prior Art | No. 1 | No. 2 |
| Naphtha | 400 | 400 | 400 |
| Cresylic Acid, mls | 150 | 120 | 90 |
| Acid Treated Clay, gms | 30 | | |
| BF$_3$ Etherate, mls | | 3.0 | 3.0 |
| Attapulgus Clay, gms | | 50 | 40 |
| Reaction Time, Hrs | 4.0 | 2.75 | 2.5 |
| Yields, Wt. Percent: [1] | | | |
| Heavy Oil | 35.0 | 27.2 | 7.5 |
| Solid Resin | 37.8 | 65.7 | 81.1 |
| Total Resinous Product | 72.8 | 92.9 | 88.6 |
| Properties: | | | |
| Heavy Oil— | | | |
| IBP, °C | 300 | 300 | 300 |
| Solubility, °C | <−60 | <−60 | <−60 |
| Color | .3 | | .3 |
| Solid Resin— | | | |
| Melting Point (Hg$^3$, °C) | 86 | 96 | 88 |
| Solubility | <−50 | <−60 | <−60 |
| Color, Neville | .5 | | .2 |

[1] Yield = 100 × $\frac{\text{pounds of product}}{(\text{pounds of naphtha})(.60) + (\text{pounds of cresylic acid})(.98)}$ The results show that the process of this invention produces substantially higher yields of resin based upon the compounds capable of reaction than was produced by the prior art process. This means that the amount of saleable products obtainable by the present procedures are substantially higher than could be produced heretofore.

Furthermore, the data demonstrate that there is greater flexibility in the type of product which can be produced. While the heavy oil and the solid resin were produced in approximately equal amounts in the prior art process, the proportions of these two products can be varied to meet particular demands by using either the steps of procedure No. 1 or procedure No. 2. Both products are saleable but the demand may vary. Thus when the demand for hard resin is high and the demand for heavy oil is low, procedure No. 2 is used. Where there is an increased demand for the heavy oil, procedure No. 1 may be used.

A third advantage is demonstrated by the fact that the procedures of the present invention produce higher yields of saleable products but with the consumption of substantially smaller amounts of the expensive cresylic acid constituent.

A fourth advantage is a material reduction in the time necessary to complete the reaction.

The properties of the heavy oil and of the solid resin produced by the process of the present invention is at least equal to that of the prior art materials.

The solubility of these resins in alcohol is determined by mixing 5 grams of the resin with 20 grams of 99% isopropyl alcohol in a 50 ml. Erlenmeyer flask. The flask is fitted with an air condenser heated until solution is complete. It is then cooled slightly and is fitted with a thermometer and further cooled with constant shaking until the first appearance of haze and of a complete cloud are noted. The temperatures are recorded. These are called the definite and indefinite solubility temperatures and are generally recorded as a fraction, the definite temperature being the denominator. If necessary a Dry Ice-acetone bath may be used to effect cooling.

Coumarone-indene solid resins are generally considered insoluble in isopropyl alcohol. A heavy oil produced during the usual sulfuric acid polymerization of coal tar naphtha may have a molecular weight of about 230 and a solubility below −60° C. The solid coumarone-indene resins having a molecular weight of about 415 or above are insoluble at the boiling point of isopropyl alcohol. Phenol modified coumarone-indene resins of comparable molecular weight made by this process have solubilities below −60° C., as will be noted from the table.

In Table II are shown the specifications for phenol modified coumarone-indene resins made by the prior art process with which this invention has been compared, and which have enjoyed wide commercial use.

Table II

|  |  | Liquid | Solid (Soft) | Solid (Hard) |
|---|---|---|---|---|
| 1. Form |  |  |  |  |
| 2. Color, Neville |  | ⅛–2 | ½–2 | ½–2 |
| 3. Soft Point Range, °C. (Ball and Shouldered Ring) |  | 5–15 | 55–65 | 70–80 |
| 4. Sp. Gr. @ 30° C |  | 1.075–1.100 |  |  |
| 5. Initial Boiling Point (760 mm.) |  | 300° C |  |  |
| 6. Isopropyl Alcohol Solubility Value, °C |  | <0 | <0 | <0 |

It will be observed that in all cases the products meet these specifications. The melting point of the solid resin is regulated by the amount of heavy oil which is removed during the steam or vacuum distillation step. The specifications for either the hard resin or the soft resin, or any intermediate grade can be met in this manner.

In Table III is shown the effect of using different ratios of the crude naphtha to the cresylic acid when employing process No. 1.

Table III

| Blend, Vol. Percent Crude/Cresylic Acid | Vol. Percent Cresylic Acid | Hard Resin Yield, Wt. Percent | Heavy Oil Yield, Wt. Percent | Total Resinous Product Yield, Wt. Percent | Definite IPA Sol. of Hard Resin |
|---|---|---|---|---|---|
| 400/120 | 23.1 | 65.8 | 27.1 | 92.9 | <−60 |
| 400/90 | 18.4 | 75.2 | 24.3 | 99.5 | <−60 |

The data show that the proportion of the heavy oil can be increased in process No. 1 by increasing the proportion of the cresylic acid.

In Table IV is shown a series of runs in accordance with process 2 in which the ratio of cresylic acid to the coal tar naphtha is varied over a considerable range.

Table IV

| Blend, Vol. Percent Crude/Cresylic Acid | Vol. Percent Cresylic Acid | Hard Resin Yield, Wt. Percent | Heavy Oil Yield, Wt. Percent | Total Resinous Product Yield, Wt. Percent | Definite IPA Sol. of Hard Resin |
|---|---|---|---|---|---|
| 400/100 | 20.0 | 78.4 | 10.7 | 89.1 | <−60 |
| 400/90 | 18.4 | 81.0 | 7.6 | 88.6 | <−60 |
| 400/87.5 | 17.9 | 85.9 | 7.3 | 92.3 | −4 |
| 400/85 | 17.5 | 85.5 | 7.0 | 92.5 | −6 |
| 400/82.5 | 17.1 | 86.0 | 6.7 | 92.7 | +1 |
| 400/80 | 16.7 | 88.0 | (*) |  | +3 |
| 400/74 | 15.6 | 89.2 | (*) |  | +20 |
| 400/68 | 14.5 | 89.4 | (*) |  | +35 |
| 400/44.5 | 10.0 | 98.5 | (*) |  | +77 |

* Small quantity of heavy oil obtained.

These data show that a minimum of about 17% by volume of cresylic acid is necessary if a hard resin of good solubility is to be obtained. It also demonstrates that the solubility characteristics of the resin can be varied widely.

By increasing the volume of cresylic acid the yield of hard resin is decreased and the yield of heavy oil is increased. At the same time the isopropyl alcohol solubility is improved. It is possible to obtain yields of from about 88% to about 95% of useful products based upon the compounds entering into the reaction by either of the two procedures, depending upon the amount of the cresylic acid used. As previously observed the ratio of the heavy oil to the hard resin will vary depending upon the procedural steps employed.

In Table V are shown the effects of carrying out procedure No. 2 under varying temperature conditions. These data indicate that the highest yield of the hard resin is obtained at a temperature of about 55° C. to 65° C., although good results are obtained between the two extremes of 25° C. and 105° C., particularly with respect to the solubility and color. These data were obtained using the reactants in the proportions shown in Table I.

*Table V*

| Temperature, °C. | | Yield, Wt. Percent | | Hard Resin | |
|---|---|---|---|---|---|
| Initially | Later | Hard Resin | PHO Yield | Sol. | Color |
| 105 | 105 | 75.5 | 14.6 | 10/8 | .4 |
| 85 | 85 | 79.9 | 11.5 | −7/−8 | .4 |
| 65 | 65 | 81.0 | 7.4 | <−60 | .2 |
| 55 | 65 | 81.0 | 7.6 | <−60 | .2 |
| 25 | 65 | 77.7 | 6.9 | <−60 | .2 |

The temperature for either procedure is best carried out at about 50° C. to about 110° C. Preferably for procedure 1, the catalyst is added while the system is maintained at about 80°–85° C. and the reaction is completed at about 90°–95° C. For procedure 2, the catalyst is added while the temperature is maintained at about 50°–60° C. and the reaction is completed at about 65°–70° C. It is possible to initiate the reaction at about 25° C. or lower, however under these circumstances the reaction is usually completed in the range of about 60°–70° C.

In summary, the following factors should be observed. For both processes the crude naphtha must pass the methanol dilution test; the tar bases in the crude naphtha should be less than 0.005% and in the cresylic acid should be less than 0.05%; both the cresylic acid and the crude naphtha must be substantially anhydrous. A test for moisture in the crude naphtha is that it shall remain clear when cooled to a temperature of about 15.6° C. For procedure 1 cresylic acid and the $BF_3$ complex are blended and heated to a temperature preferably between about 25° C. and 95° C. The crude indene-containing naphtha is added slowly over a period of between about one to about twelve hours. This is dependent in part upon the temperature control which can be effected, since during the initial stages, the heat of reaction may get out of hand. The heavy oil is produced in yields greater than about 18% and the hard resin in yields above about 53%.

In process No. 2 the cresylic acid and naphtha are blended and heated to a temperature between about 50°–95° C. The $BF_3$ complex catalyst is added slowly, the period of time required depending upon the temperature control that can be effected, i.e., the efficiency and capacity of the cooling system. As in the case of process No. 1, the combining of the ingredients is effected in as short a time as conveniently can be done with the necessary degree of temperature control, and the reaction is completed at temperatures in accordance with those set forth above. This process yields heavy oil in amounts of about 11% or less and produces the hard resin in yields from about 78–90% by weight of the combined weight of the cresylic acids and of the polymerizable components of the indene-containing naphtha. In order to produce the best results, a slight excess of cresylic acid should be present as indicated by its presence after the specific gravity of the reaction mixture has reached a substantially constant value. Both processes produce marketable condensation products in yields close to 90%, although the distribution between the heavy oil and the hard resin differs according to the procedure used. In both instances the solubility in isopropyl alcohol in the hard resin is less than zero. In both processes the reaction time required is less than that required in the prior are processes employing activated clay and the yields are substantially higher.

From a commercial standpoint, the discovery that the boron trifluoride complexes provide unique methods for producing the phenol-modified coumarone-indene resin and oil, is of considerable significance. In addition to being less expensive from the standpoint of raw materials and operation, and in the production of higher yields of desirable products these processes complement one another. Thus, when the market demand is high for the heavy oil, the first process would be employed. If the market demand for the heavy oil decreases, the second procedure would be employed. Either process can be carried out in the same apparatus so that it is not necessary to have more than one plant.

Having described our invention in terms of the best mode known to us for its operation but not intending to be limited to the exact conditions illustrated, we claim as our invention:

1. A process for producing alcohol soluble phenol-modified resins which comprises forming an anhydrous mixture of an essentially aromatic naphtha boiling principally in the range of about 160° C. to about 200° C. in which indene is the principal polymerizable constituent, and anhydrous cresylic acid, in proportions such that a small excess of said acids remain in the reaction mixture when the reaction is terminated, adding thereto a catalytic amount of an anhydrous boron trifluoride catalyst, said catalyst being a complex of stoichiometric proportions of boron trifluoride and a compound selected from the group consisting of the lower alkyl ethers and lower alkanoic acids, in increments such that the temperature in the reaction zone does not exceed about 110° C., continuing the reaction at a temperature not in excess of about 110° C. until the specific gravity of the reaction mixture becomes substantially constant, neutralizing the catalyst, removing unreacted materials therefrom and recovering the alcohol-soluble phenol-modified product.

2. The process of claim 1 wherein the catalyst is a complex of substantially stoichiometric proportions of boron trifluoride and ethyl ether.

3. The process of claim 1 wherein the temperature is maintained within the range of about 25° C. to about 55° C. during the addition of the catalyst and is then raised to a temperature of about 55° C. to about 95° C. to complete the reaction.

4. A process for producing an alcohol soluble phenol-modified resin which comprises introducing into a reaction zone anhydrous cresylic acids and an anhydrous boron trifluoride catalyst, said catalyst being a complex of stoichiometric proportions of boron trifluoride and a compound selected from the group consisting of the lower alkyl ethers and lower alkanoic acid, mixing therewith in said zone, an anhydrous, essentially aromatic naphtha boiling principally in the range of about 160° C. to about 200° C., indene being the principal polymerizable constituent of said naphtha, said naphtha being added at such a rate that the temperature in said reaction zone does not exceed about 110° C., the amount of said naphtha added being such that there remains an excess of unreacted cresylic acid in the reaction mixture in said zone when said reaction is terminated, maintaining the reaction temperature in said zone below about 110° C. at all times until the specific gravity of the reaction mixture becomes substantially constant, neutralizing the catalyst, removing unreacted materials from the reaction mixture, and recovering the alcohol soluble phenol-modified product.

5. The process of claim 4 in which the anhydrous mixture of cresylic acids and boron trifluoride is diluted with an aromatic hydrocarbon boiling above the reaction temperature but below about 300° C.

6. The process of claim 4 wherein the catalyst is a complex of substantially stoichiometric proportions of boron trifluoride and ethyl ether.

7. A process for producing alcohol soluble phenol-modified resins which comprises forming an anhydrous mixture of an essentially aromatic naphtha boiling principally in the range of about 160° C. to about 200° C. in which indene is the principal polymerizable constituent and anhydrous cresylic acid, in proportions such that a small excess of said acids remain in the reaction mixture when the reaction is terminated, admixing therewith as a catalyst, a catalytic amount of an anhydrous, organic-complex of boron trifluoride, in increments such that the temperature in the reaction zone does not exceed about 110° C., continuing the reaction at a temperature not in excess of about 110° C. until the specific gravity of the reaction mixture becomes substantially constant, neutralizing the catalyst, removing unreacted materials therefrom and recovering the alcohol-soluble phenol-modified product.

8. A process for producing an alcohol soluble phenol-modified resin which comprises forming a mixture of anhydrous cresylic acid and, as a catalyst, an anhydrous, organic complex of boron trifluoride, mixing therewith in said zone, an anhydrous, essentially aromatic naphtha boiling principally in the range of about 160° C. to about 200° C., indene being the principal polymerizable constituent of said naphtha, said naphtha being added at such a rate that the temperature in said reaction zone does not exceed about 110° C., the amount of said naphtha added being such that there remains an excess of unreacted cresylic acid in the reaction mixture in said zone when said reaction is terminated, maintaining the reaction temperature in said zone below about 110° C. at all times until the specific gravity of the reaction mixture becomes substantially constant, neutralizing the catalyst, removing unreacted materials from the reaction mixture, and recovering the alcohol soluble phenol-modified product.

9. The process of claim 4 wherein the temperature is maintained within the range of about 25° C. to about 55° C. during the addition of the catalyst and is then raised to a temperature of about 55° C. to about 95° C. to complete the reaction.

References Cited in the file of this patent

UNITED STATES PATENTS

| 2,466,889 | Geiger | Apr. 12, 1949 |
| 2,502,003 | Geiger | Mar. 28, 1950 |

FOREIGN PATENTS

| 295,065 | Switzerland | Dec. 15, 1953 |